(12) United States Patent
Jameson

(10) Patent No.: US 6,768,989 B2
(45) Date of Patent: Jul. 27, 2004

(54) COLLECTION RECOGNIZER

(76) Inventor: Kevin Wade Jameson, 148 Edgebank Place NW, Calgary, AB (CA), T3A 4L4

( * ) Notice: Subject to any disclaimer, the term of this patent is extended or adjusted under 35 U.S.C. 154(b) by 456 days.

(21) Appl. No.: 09/885,080

(22) Filed: Jun. 21, 2001

(65) Prior Publication Data

US 2003/0084026 A1 May 1, 2003

(51) Int. Cl.$^7$ ................................................ G06F 7/00
(52) U.S. Cl. .................... 707/3; 707/6; 707/9; 707/203
(58) Field of Search ............................ 707/3, 6, 9, 203

(56) References Cited

U.S. PATENT DOCUMENTS

| | | | |
|---|---|---|---|
| 5,941,944 A | * | 8/1999 | Messerly .................... 709/203 |
| 6,374,402 B1 | * | 4/2002 | Schmeidler et al. ........ 717/167 |
| 6,460,036 B1 | * | 10/2002 | Herz ............................ 707/10 |
| 6,564,263 B1 | * | 5/2003 | Bergman et al. ............ 709/231 |
| 2001/0047400 A1 | * | 11/2001 | Coates et al. ............... 709/219 |

* cited by examiner

*Primary Examiner*—John Breene
*Assistant Examiner*—Kuen Lu

(57) ABSTRACT

Collection recognizers improve the productivity of knowledge workers by enabling automated systems to recognize interesting collections of arbitrary computer files for automated processing. In operation, a collection recognizer detects collections within a search space, selects interesting collections from the group of detected collections, and finally makes information about the selected collections available to software programs for subsequent automated processing. Collection recognizers help to enable the construction of fully automated collection processing systems.

35 Claims, 23 Drawing Sheets

FIG. 1
PRIOR ART
```
1    c:\collections
2       notes.txt
3       myletter.doc
4       c-myhomepage
5
6          s
7             homepage.html
8             myphoto.jpg
```
FIG. 2
```
1    c:\collections
2       notes.txt
3       myletter.doc
```
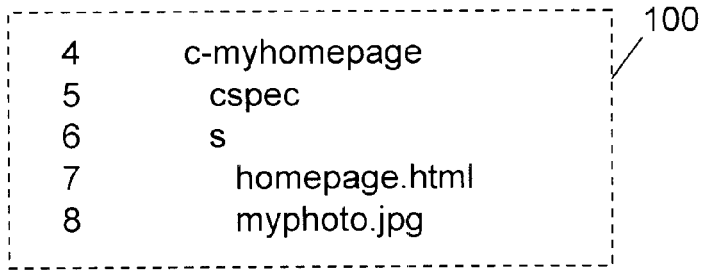
```
4       c-myhomepage
5          cspec
6          s
7             homepage.html
8             myphoto.jpg
```
FIG. 3
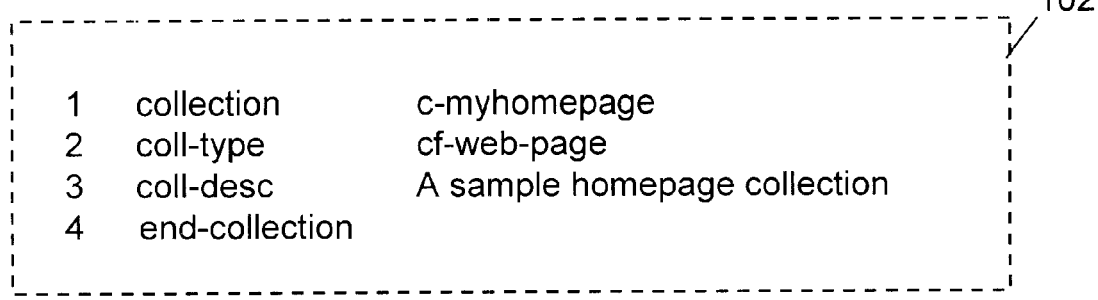
```
1    collection      c-myhomepage
2    coll-type       cf-web-page
3    coll-desc       A sample homepage collection
4    end-collection
```

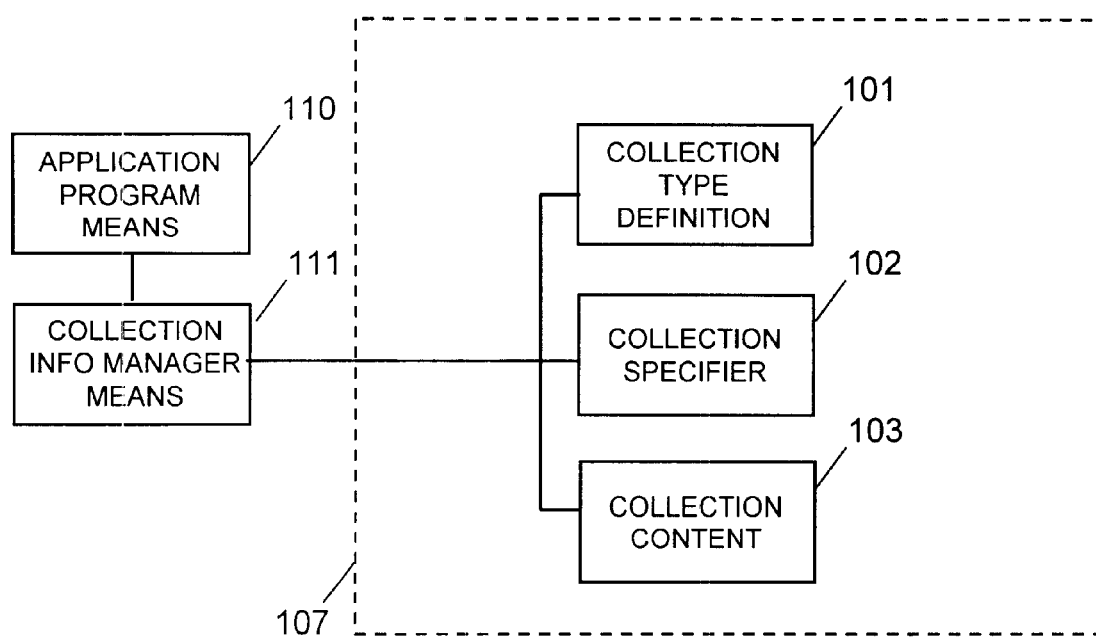
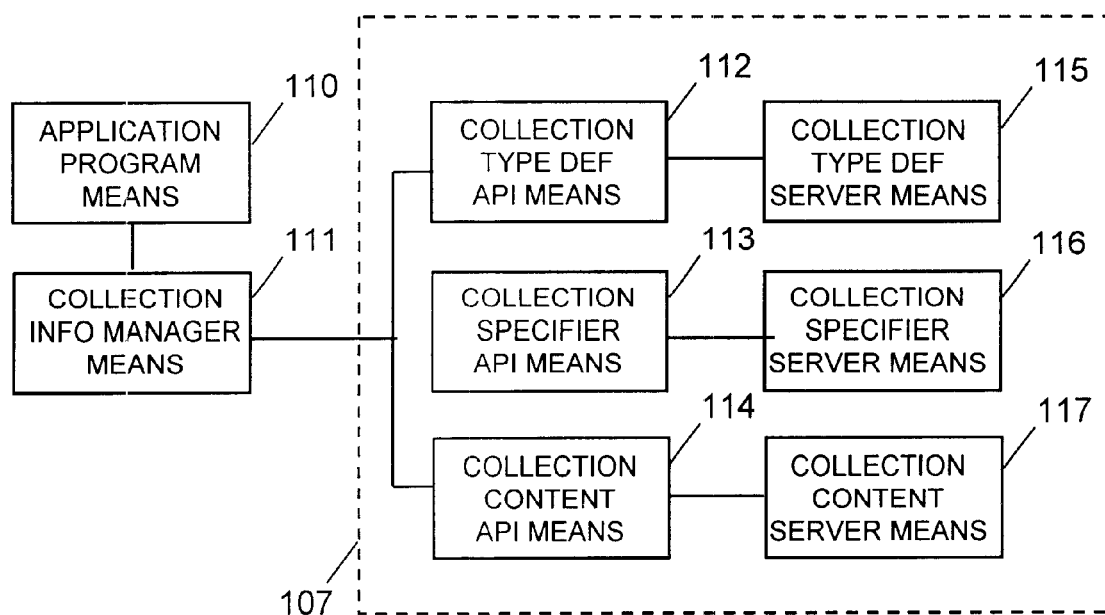

FIG. 8

```
1   /* collection data structure */
2   collection-info {

3     + specifier_info
4        + coll-type-indicator
5        + other specifier information ...

6     + content_info
7        + content_location_info ...
8        + content_members ...
9        + other content information...

10    + other collection structure information...
11  }
```

FIG. 9

```
1   /* collection type definition data structure */
2   collection-type-definition-info {

3     + coll-type-name
4     + collection internal structure info ...
5     + collection content location info ...
6     + collection content type recognition info ...

7     + other collection type definition information...
8   }
```

FIG. 10

| KEY | VALUE |
|---|---|
| | /* collection type internal structure definitions */ |
| 1 | |
| 2 dir_source_files | .\s |
| 3 dir_doc_files | .\doc |
| | |
| 4 | /* content location definitions (per-type content links) */ |
| 5 content_subtree_http | http://host.com/some/dir/name |
| 6 content_subtree_ftp | ftp://host.com/some/dir/name |
| 7 content_subtree_nfs | /some/local/directory/name |
| | |
| 8 | /* content type recognition definitions */ |
| 9 content_policy | subtree_below_cspec_file |
| 10 content_file_type | .c      file_cpp |
| 11 content_file_type | .c      file_c |
| 12 content_file_type | .h      file_c_include |
| 13 content_file_type | .doc    file_ms_word |
| 14 content_file_type | .html   file_html |
| 15 content_file_type | .xls    file_ms_excel |
| | |
| 16 | /* collection processing definitions */ |
| 17 compile_c_files | yes |
| 18 compiler_windows | vc++ |
| 19 compiler_unix | gcc |
| 20 build platforms | Win98, Win2000, linux |
| 21 process files | compile link |
| 22 link libraries | stdio math sock |
| | |
| 23 | /* results dispatching definitions */ |
| 24 results_ftp_host | ftp.output.com |
| 25 results_ftp_dir | c:\ftphome\collection\results |

FIG. 14

```
1   /* simplified collection recognition algorithm */
2   call get_runtime_info 3   /* detect collections */
4   call get-detected-collections
5       call detect-coll-signatures-api-means
6       call collection-information-manager 7   /* select collections from detected collections */
8   call select_collections 9   /* derive additional optional collection information */
10  call derive-additional-collection-info
11      call collection-information-manager 12  /* format and output recognition results */
13  call output_recognition_info
14  Return recognition info from rec-coll data structure to caller
```

FIG. 15

```
1   /* rec-coll recognized-collections data structure */

2   rec-coll-structure {
3     + rec-coll-list

4       + coll-structure-1
5         + cspec_info ...
6         + ctype_def_info ...
7         + ccontent_info ...
8         + other_coll_info 9       + coll-structure-2
10        + cspec_info ...
11        + ctype_def_info ...
12        + ccontent_info ...
13        + other_coll_info 14      + coll-structure-3
15         ...

16    + other collection recognition info
17  }
```

FIG. 16

```
1   c:\collections
2       programs
3           helloworld
4               c-hello-library
5               c-hello 6           c-myprogram 7       parts
8           c-include-files
9           c-library-one
10          c-library-two
11          ...
```

FIG. 17

| Cspec Accessors | Coll-type |
| --- | --- |
| 1  c:\collections\programs\helloworld\c-hello-library\cspec | library |
| 2  c:\collections\programs\helloworld\c-hello\cspec | program |
| 3  c:\collections\c-myprogram\cspec | program |
| 4  c:\collections\parts\c-include-files\cspec | include |
| 5  c:\collections\parts\c-library-one\cspec | library |
| 6  c:\collections\parts\c-library-two | library |
| 7  ... | |

FIG. 18

```
1   /* perform selection using info within derived search space */
2   Open derived search space text file for reading
3   Loop over all collection entries in the file
4       If current entry coll-type = search criteria coll-type
5           Add current collection accessor to rec-coll data structure
6       Continue with next collection entry
7   Close the text file
8   Optionally return rec-coll data structure to caller 9   /* perform selection using collection specifier info */
10  Loop over all entries in rec-coll structure
11      Read collection specifier info for current rec-coll entry
12      If current cspec info = search criteria cspec info
13          Add current cspec info to rec-coll structure
14      Else
15          Mark current rec-coll entry for later deletion
16      Continue with next rec-coll entry
17  Remove all rec-coll entries that were marked for deletion
18  Optionally return rec-coll data structure to caller 19  /* perform selection using collection type definition info */
20  Use same algorithm as lines 9-18, but
    Use collection type definition info instead of collection specifier info 21  /* perform selection using collection content info */
22  Use same algorithm as lines 9-18, but
    Use collection content info instead of collection specifier info 23  /* calculate optional additional recognition info and return to caller */
24  Optionally calc additional recognition info, add it to rec-coll structure
25  Return info in rec-coll data structure to caller
```

FIG. 19

1   coll-search-space-table 2   01 accessor                                             text field
3   02 coll-type                                            text field
4   03 ...other table column definitions 5   select accessor from coll-search-space-table
6   where ( coll-type = 'library')

7   Output of query is a list of all entries whose coll-type value
8   is 'library'. The application program that made the query can
9   now use the collection specifier accessors to read collection
10  specifier information for each selected collection.

FIG. 20

1    fs_nca_mkdir
2    fs_nca_rmdir
3    fs_nca_chdir
4    fs_nca_opendir
5    fs_nca_readdir
6    fs_nca_closedir
7    fs_nca_dir_entry_type
8    fs_nca_dir_attributes_get/set
9    fs_nca_file_attributes_get/set
10   fs_nca_rmfile
11   fs_nca_openfile
12   fs_nca_closefile
13   ...other related API functions

FIG. 22

| | |
|---|---|
| 1 | fs_ca_coll_create |
| 2 | fs_ca_coll_delete |
| 3 | fs_ca_coll_cd_to_dir |
| 4 | fs_ca_coll_open |
| 5 | fs_ca_coll_read |
| 6 | fs_ca_coll_close |
| 7 | fs_ca_coll_entry_type |
| 8 | fs_ca_coll_entry_attributes |
| 9 | fs_ca_coll_entry_delete |
| 10 | fs_ca_coll_list |
| 11 | fs_ca_coll_select |
| 12 | fs_ca_coll_detect |
| 13 | fs_ca_coll_list_selected |
| 14 | ...other related API functions |

FIG. 23

| | |
|---|---|
| 1 | Use explicit cspec accessor provided by invocation |
| 2 | Use contents of filename or of file suffix |
| 3 | Use directory name, directory suffix, or hidden attribute |
| 4 | Use filename, suffix, timestamp, owner, read-only status, or last modified timestamp |
| 5 | Use directory name, suffix, timestamp, owner, read-only status, hidden status |
| 6 | Use relative location of files and/or directories |
| 7 | Use special operating system attributes assigned to file or directory entries (eg. directory or file type bits) |
| 8 | Use patterns involving multiple instances of files, directories, attributes above, or combinations thereof |

FIG. 24

1. Start with initial directory
2. Loop upwards:
3.    Test for collection signature match
4.    If found, stop with success
5.    Change dir 1 directory upwards (upclimb 1)
6.    If change dir upwards fails, stop with failure
7.    Else continue with next iteration of loop (step 3)

FIG. 25

```
1    c:\collections
2        notes.txt
3        myletter.doc
4        c-myhomepage   3
5    2/  cspec
6       -s
7        homepage.html
8    1/  myphoto.jpg
9       -images
10           button.gif
```

FIG. 26

1. Start with initial directory
2. Ask CA file system API for the nearest collection above current directory
3. If a collection is found, stop with success
4. Else stop with failure to find a collection

FIG. 27

1. Start with initial directory
2. Open it, read all directory entries, close it
3. For all file entries in current directory:
4.     Obtain filesystem attributes from OS entry data
5.     Check for, and record, collection signature matches
6. For all subordinate dir entries within the current directory:
7.     Open, read, close a next subordinate directory
8.     Obtain filesystem attributes from OS entry data
9.     Check for, and record, collection signature matches
10. Stop when all entries in all subordinate dirs in the subtree below the initial directory have been examined
11. Write list of matched collections to memory, to disk, etc.

FIG. 28

```
1    c:\collections
2        programs
3            helloworld
4                c-hello-library      VO=6
5                c-hello              VO=5
6            c-myprogram              VO=1
7        parts
8            c-include-files          VO=2
9            c-library-one            VO=3
10           c-library-two            VO=4
11           ...
```

FIG. 29

1. Start with initial directory
2. Ask CA API for a list of all collections below the starting directory
3. Check for, and record, collection signature matches using the list obtained in Step 2
4. Write list of matched collections to memory, disk, etc

FIG. 30

1. Select all detected collections (no selection tests)
2. Select collection based on filesystem (outside coll) attributes
3. Select collection based on collection (inside coll) attributes

FIG. 31

OUTSIDE COLLECTION (SIGNATURE) TESTS

1. Select a special filename named 'cspec'
2. Select a special hidden child subdirectory named 'info'
3. Select a special file suffix named 'cspec'

INSIDE COLLECTION (CONTENT) TESTS

4. Select collection if a special file named 'cspec' exists and coll_type = 'html_homepage'
5. Reject collection if coll_name = 'c-myhomepage'
6. Reject collection if cmd-opt = 'recognizer-skipme'

FIG. 32

| | | |
|---|---|---|
| 1 | collection | c-myhomepage |
| 2 | coll-type | html-homepage |
| 3 | coll-desc | A sample homepage collection |
| 4 | cmd-opt | recognizer-skipme |
| 5 | end-collection | |

FIG. 33

1. Detect collection signature within desired search space
2. Derive cspec accessor from signature
3. Read cspec to get specifier info and coll-type identifier
4. Read collection type definition
5. Read collection contents 6. Determine selectability using outside-collection tests
7. Determine selectability using inside-collection tests
8. Optionally derive additional recognition information
9. Record recognized collections etc in rec-coll structutre
10. Return recognition info to caller by writing rec-coll structure information to memory or disk storage

FIG. 34

| | | |
|---|---|---|
| 1 | detection policy | special filename named 'cspec' |
| 2 | cspec accessor | c:\collections\c-myhomepage\cspec |
| 3 | selection policy | accept all detections |
| 4 | content policy | all files in subtree below cspec file |
| | | |
| 5 | detection policy | special file suffix named '.cspec' |
| 6 | cspec accessor | c:\collections\c-myhomepage\myinfo.cspec |
| 7 | selection policy | coll_type=html_homepage |
| 8 | content policy | root of content subtree defined in cspec (eg. cc_root=c:\collections\c-myhomepage\some-content-dir) |
| | | |
| 9 | detection policy | special hidden directory name 'collection' |
| 10 | cspec accessor | <collection_dir>\..\cspec |
| 11 | selection policy | (coll_type=c_program) + (cname='helloworld') |
| 12 | content policy | subtree c:\collections\programs\helloworld |

FIG. 35

DB Table 1       coll-sig-attributes 1  coll-id         (a unique identifier for this collection)
2  type            (file, dir, etc.)
3  owner           (owner of collection)
4  last modified   (timestamp of last modification)
5  ...

6  select coll-id from coll-sig-attributes
7      where <coll-attributes = collection signature criteria>

8  Output is a list of detected collections

FIG. 36

DB Table 2       coll-cspec-accessor 1  coll-id         (unique coll id)
2  cspec-accessor  (pathname or db id)

3  select cspec-accessor from coll-cspec-accessor
4      where (coll-id=<a detected a coll-id>)

5  Output is a list of cspec accessors for detected collections

FIG. 37

DBTable 3          coll-cspec-values 1 cspec-accessor    (pathname or db field value)
2 cspec-attr          (name of a cspec attribute)
3 cspec-value         (value of a cspec attribute)
4 cspec-content-id   (content id points to coll content)

5 select cspec-attr, cspec-value, cspec-content-id
6     from coll-cspec-values
7 where (cspec-accessor = accessor of interest)

8 Output is list of cspec contents for the specified cspec-
9     accessor. In particular, this query will return a
10     cspec-content-id for use in the coll-content-values table

FIG. 38

DB Table 4         coll-content-values 1 cspec-content-id  (content id identifies content for this coll)
2 cc-pathname      (location of some collection content)

3 select cc-pathname from coll-content-values
4 where (cspec-content-id=<a cspec-content-id from
         coll-cspec-values table>)

5 Output is a list of pathnames to ASCII files stored outside the db
6   (but could also point to files stored as objects within the db).

FIG. 39

1  Detect coll signatures using coll-sig-attributes table
2  Derive cspec accessors using coll-cspec-accessor table
3  Derive cspec info using coll-cspec-values table
4  Read collection content using coll-content-values table
5  Determine selectability using content info from steps 1-4
6  Optionally derive or gather more recognition information
7  Return recognition info to caller by writing recognition info
8     to memory or to disk, etc.

FIG. 40

| | | |
|---|---|---|
| 1 | detection policy | db entry type=collection |
| 2 | cspec accessor | retrieve from coll-cspec-accessor table in db |
| 3 | selection policy | accept all detections, allow skipping |
| 4 | content policy | retrieve collection content pathnames from collection content table |

COLLECTION RECOGNIZER

CROSS REFERENCES TO RELATED APPLICATIONS

The present invention uses the Collection Information Manager from the following patent application, which is filed contemporaneously herewith, and which is incorporated herein by reference:

USPTO Ser. No. 09/885,078, Collection Information Manager; Kevin W Jameson.

FIELD OF THE INVENTION

This invention relates to automated software systems for processing collections of computer files in arbitrary ways, thereby improving the productivity of software developers, web media developers, and other humans and computer systems that work with collections of computer files.

BACKGROUND OF THE INVENTION

The general problem addressed by this invention is the low productivity of human knowledge workers who use labor-intensive manual processes to work with collections of computer files. One promising solution strategy for this software productivity problem is to build automated systems to replace manual human effort.

Unfortunately, replacing arbitrary manual processes performed on arbitrary computer files with automated systems is a difficult thing to do. Many challenging subproblems must be solved before competent automated systems can be constructed. As a consequence, the general software productivity problem has not been solved yet, despite large industry investments of time and money over several decades.

The present invention provides one piece of the overall functionality required to implement automated systems for processing collections of computer files. In particular, the current invention has a practical application in the technological arts because it provides application programs with a convenient, precise, scalable, and fully automated means for recognizing particular collections of files for automated processing.

The Collection Recognition problem is one important problem that must be solved to enable the construction of automated processing systems. It is the problem of how to automatically recognize particular collections of files for automated processing.

Some interesting characteristics of the collection recognition problem that make it difficult to solve include at least these: collections can have arbitrary data type; collections can have arbitrary size and content; collections can have arbitrary internal structure; collections can require arbitrary processing; collections can be arbitrarily located within a filesystem, database, or network search space; only a few interesting collections might be selected from a large pool of collections; selection processes can use internal content or external filesystem attributes; and arbitrary numbers of collections may be involved.

General Shortcomings of the Prior Art

A professional prior art search for the present invention was performed, but produced no meaningful, relevant works of prior art. Therefore the following discussion is general in nature, and highlights the significant conceptual differences between file-oriented mechanisms in the prior art and the novel collection-oriented mechanisms represented by the present invention.

Prior art approaches lack support for collections. This is the largest limitation of all because it prevents the use of high-level collection abstractions that can significantly aid productivity.

Prior art approaches lack user-defined data types for collections of files. This is a significant limitation because user-defined data types are a primary mechanism for carrying relevant semantic information about collections of files.

Prior art approaches lack shared data types for collections of files. This is a significant limitation because sharable type definitions are a primary mechanism for propagation and reuse of important collection type information.

Prior art approaches lack user-defined per-collection instance data. This is a significant limitation because per-instance data is the primary mechanism for augmenting or overriding general type definition information shared among all collections of a particular type.

Prior art approaches lack the ability to use collection type definition information and collection instance data for match criteria in collection recognition searches. This is a significant limitation because collection type definition and collection instance data are both rich sources of useful recognition matching information.

As can be seen from the above description, prior art approaches have several important disadvantages. Notably, prior art approaches do not support collections, do not support user-defined collection instance information, and do not support user-defined collection data types. These are the three most important limitations of all.

In contrast, the present collection recognizer invention has none of these limitations, as the following disclosure will show.

SUMMARY OF THE INVENTION

A collection recognizer dynamically detects and selects collections from within a search space, and makes the resulting collection recognition information available to software programs, thereby enabling the construction of fully automated software systems for processing collections of arbitrary computer files.

In operation, a collection recognizer is used by an application program to recognize interesting collections of files for processing. A collection recognizer first detects a set of interesting collection signatures from within a search space using signature detection criteria, thereby forming a first pool of detected collections. From the first pool of detected collections, a second pool of selected collections is created, using various selection criteria. Selection criteria can include search space information, collection instance information, collection content information, and collection type definition information. Ultimately, a collection recognizer returns information about detected and selected collections to a calling program for subsequent processing.

Collection recognizers solve the collection recognition problem by providing software programs with a generalized, precise, scalable, customizable, and extensible means for recognizing collections within a filesystem search space. In particular, collection recognizers return information-rich collection data structures back to calling software programs. Collection recognizers thus enable automated collection processing systems to recognize collections of arbitrary computer files in more precise, more automated, more scalable, and more knowledgeable ways than were previously possible.

OBJECTS AND ADVANTAGES

The present collection recognizer invention solves all of the general prior art limitations described previously.

Specifically, collection recognizers support collections of files, support user-defined collection types, support shared collection types, support user-defined per-collection instance data, and support use of collection type and instance data in recognition searches.

The present collection recognizer invention also has the following additional objects and advantages.

One object of the present invention is to provide a generalized, fully automated collection recognizer means for software programs, thereby enabling the construction of generalized, large-scale, automated collection processing systems.

Another object is to provide sufficient flexibility, extensibility, and capacity to strongly resist scale-up failure, thereby enabling automated collection recognizers and collection processing systems to scale up smoothly, with reduced risk of scale-up failure.

Another object is to provide a collection recognition model that is independent of search space type, thereby enabling collection recognition searches to be conducted using various search spaces including filesystems, databases, and distributed networks.

Another object is to produce information-rich data structures from the recognition process, containing both collection information and recognition process information, thereby saving application programs the effort of obtaining collection and process information themselves.

Other features and advantages of the present Collection Recognizer invention will become apparent upon further reading of the drawings and disclosure that follow.

BRIEF DESCRIPTION OF DRAWINGS

FIG. 1 shows a sample prior art filesystem folder in a typical personal computer filesystem.

FIG. 2 shows how a portion of the prior art folder in FIG. 1 has been converted into a collection 100 by the addition of a collection specifier file 102 named "cspec" FIG. 2 Line 5.

FIG. 3 shows an example physical representation of a collection specifier 102, implemented as a simple text file such as would be used on a typical personal computer filesystem.

FIG. 6 shows a logical diagram of how a Collection Information Manager Means 111 would act as an interface between an application program means 110 and a collection information means 107, including collection information sources 101–103.

FIG. 7 shows a physical software embodiment of how an Application Program Means 110 would use a Collection Information Manager Means 111 to obtain collection information from various collection information API means 112–114 connected to various collection information server means 115–117.

FIG. 8 shows an example software collection datastructure that relates collection specifier and collection content information for a single collection instance.

FIG. 9 shows an example collection type definition datastructure, such as might be used by software programs that process collections.

FIG. 10 shows a more detailed example of the kinds of information found in collection type definitions.

FIG. 14 shows a simplified algorithm for performing collection recognition, using the software components shown in FIG. 13.

FIG. 15 shows an example datastructure of collection recognizer output information, containing a list of detected and selected collections and other information.

FIG. 16 shows a tree of collections stored within a typical personal computer filesystem.

FIG. 17 shows a derived list search space view based on the collection tree shown in FIG. 16. The derived list search space, a simple text-file, is comprised of collection specifier accessor pathnames and collection type values.

FIG. 18 shows a simplified algorithm for a collection recognizer using the derived text-file search space of FIG. 17.

FIG. 19 shows an example logical database table layout for a derived database search space based on the collection tree shown in FIG. 16. The derived database search space is composed of one database table containing at least 2 columns describing collection accessor and collection type values.

FIG. 20 shows example software function interfaces from a non-collection-aware (NCA) filesystem API 163 typical of a modern personal computer.

FIG. 22 shows example software function interfaces that might be part of a collection-aware (CA) filesystem API 162.

FIG. 23 shows sample collection signature criteria constructed from filesystem attributes provided by a typical non-collection-aware (NCA) filesystem API 163 implementation.

FIG. 24 shows a simplified upsearch algorithm for detecting a collection signature above the current working directory, using a non-collection-aware (NCA) 163 filesystem search space.

FIG. 25 shows how the algorithm of FIG. 24 would proceed to change directories while attempting to detect a collection signature, using a non-collection-aware (NCA) 163 filesystem search space.

FIG. 26 shows a simplified up search algorithm for detecting a collection signature, using a collection-aware (CA) 162 filesystem search space.

FIG. 27 shows a simplified down search algorithm for detecting collection signatures below an initial starting directory, using a typical non-collection-aware (NCA) 163 filesystem search space.

FIG. 28 shows how a down search algorithm might sequentially visit the collections of FIG. 16, first according to depth within the tree, and second, according to alphabetic order of collection names.

FIG. 29 shows a simplified down search algorithm for detecting collection signatures using a collection-aware (CA) 162 filesystem search space.

FIG. 30 shows sample policies for selecting interesting collections from sets of detected collections produced by the up search or down search algorithms mentioned above.

FIG. 31 shows sample selection tests based on information contained outside (signature) and inside (content) the collections being selected.

FIG. 32 shows an example collection specifier that contains a special command option requesting collection recognizers to skip the host collection during recognition actions.

FIG. 33 shows a simplified collection recognition algorithm that includes both detection and selection actions.

FIG. 34 shows sample collection recognition values that reflect various recognition policy decisions for filesystem implementations of collections. Three sets of recognition policies are shown.

FIG. 35 shows an example database schema and query expression that might be used to represent and perform collection signature detection activities, using a database implementation of collections.

FIG. 36 shows an example database schema and query expression that might be used to represent and perform collection specifier accessor calculation activities, using a database implementation of collections.

FIG. 37 shows an example database schema and query expression that might be used to represent and perform collection specifier access activities, using a database implementation of collections.

FIG. 38 shows an example database schema and query expression that might be used to represent and perform collection content access activities, using a database implementation of collections.

FIG. 39 shows an example high-level recognition algorithm that includes both detection and selection actions, for the sample database implementation of collections shown in previous diagrams.

FIG. 40 shows sample recognition values that reflect various recognition policy decisions and values for the sample database implementation of collections shown in previous diagrams.

LIST OF DRAWING REFERENCE NUMBERS

Figure 4:
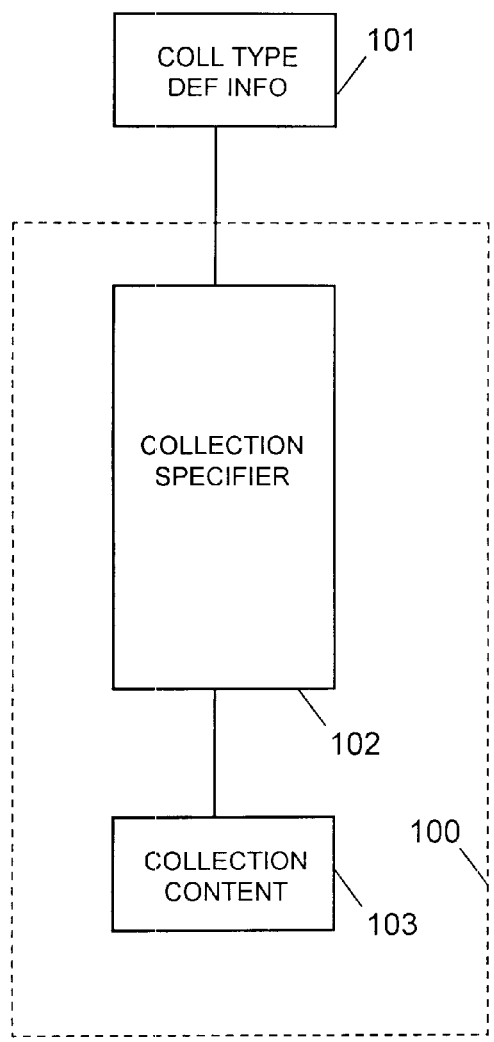
FIG. 4 shows four major information groupings for collections, including collection type definition 101, collection specifier 102, collection content 103, and collection 100.

100 A collection formed from a prior art folder
101 Collection type definition information
102 Collection specifier information
103 Collection content information
104 Per-collection collection processing information
105 Per-collection collection type indicator
106 Per-collection content link specifiers
107 Collection information means
108 Collection signature search space
110 Application program means
111 Collection information manager means
112 Collection type definition API means
113 Collection specifier API means
114 Collection content API means
115 Collection type definition server means
116 Collection specifier server means
117 Collection content server means
130 Collection recognizer means
140 Module for managing collection recognition process
141 Module for obtaining runtime information
142 Module for getting detected collections
143 Module for detecting collection signatures
144 Module for selecting from detected collection pool
145 Module for deriving additional recognition information
146 Module for formatting recognition output information
160 Collection recognition enabled application architecture
162 Collection-aware storage system API means
163 Non-collection-aware storage system API means
164 A computer operating system
165 A computer disk storage means
170 A non-collection-enabled application architecture
171 Collection-enabled application program means
172 Application data server means
175 A collection-enabled application architecture
176 A collection-enabled application wrapper program
177 A collection-enabled application wrapper architecture

DETAILED DESCRIPTION

Overview of Collections

This section introduces collections and some related terminology. Collections are sets of computer files that can be manipulated as a set, rather than as individual files. Collection information is comprised of three major parts: (1) a collection specifier that contains information about a collection instance, (2) a collection type definition that contains information about how to process all collections of a particular type, and (3) optional collection content in the form of arbitrary computer files that belong to a collection.

Collection specifiers contain information about a collection instance. For example, collection specifiers may define such things as the collection type, a text summary description of the collection, collection content members, derivable output products, collection processing information such as process parallelism limits, special collection processing steps, and program option overrides for programs that manipulate collections. Collection specifiers are typically implemented as simple key-value pairs in text files or database tables.

Collection type definitions are user-defined sets of attributes that can be shared among multiple collections. In practice, collection specifiers contain collection type indicators that reference detailed collection type definitions that are externally stored and shared among all collections of a particular type. Collection type definitions typically define such things as collection types, product types, file types, action types, administrative policy preferences, and other information that is useful to application programs for understanding and processing collections.

Collection content is the set of all files and directories that are members of the collection. By convention, all files and directories recursively located within an identified set of subtrees are usually considered to be collection members. In addition, collection specifiers can contain collection content directives that add further files to the collection membership. Collection content is also called collection membership.

Collection is a term that refers to the union of a collection specifier and a set of collection content.

Collection information is a term that refers to the union of collection specifier information, collection type definition information, and collection content information.

Collection membership information describes collection content.

Collection information managers are software modules that obtain and organize collection information from collection information stores into information-rich collection data structures that are used by application programs.

Collection Physical Representations—Main Embodiment

FIGS. 1–3 show the physical form of a simple collection, as would be seen on a personal computer filesystem.

FIG. 1 shows an example prior art filesystem folder from a typical personal computer filesystem. The files and directories shown in this drawing do not implement a collection 100, because no collection specifier 102, FIG. 2 Line 5 exists to associate a collection type definition FIG. 4 101 with collection content information FIG. 4 103.

FIG. 2 shows the prior art folder of FIG. 1, but with a portion of the folder converted into a collection 100 by the addition of a collection specifier file FIG. 2 Line 5 named "cspec". In this example, the collection contents FIG. 4 103 of collection 100 are defined by two implicit policies of a preferred implementation.

First is a policy to specify that the root directory of a collection is a directory that contains a collection specifier file. In this example, the root directory of a collection 100 is a directory named "c-myhomepage" FIG. 2 Line 4, which in turn contains a collection specifier file 102 named "cspec" FIG. 2 Line 5.

Second is a policy to specify that all files and directories in and below the root directory of a collection are part of the collection content. Therefore directory "s" FIG. 2 Line 6, file "homepage.html" FIG. 2 Line 7, and file "myphoto.jpg" FIG. 2 Line 8 are part of collection content FIG. 4 103 for said collection 100.

FIG. 3 shows an example physical representation of a collection specifier file 102, FIG. 2 Line 5, such as would be used on a typical personal computer filesystem.

Collection Information Types

Figure 5:
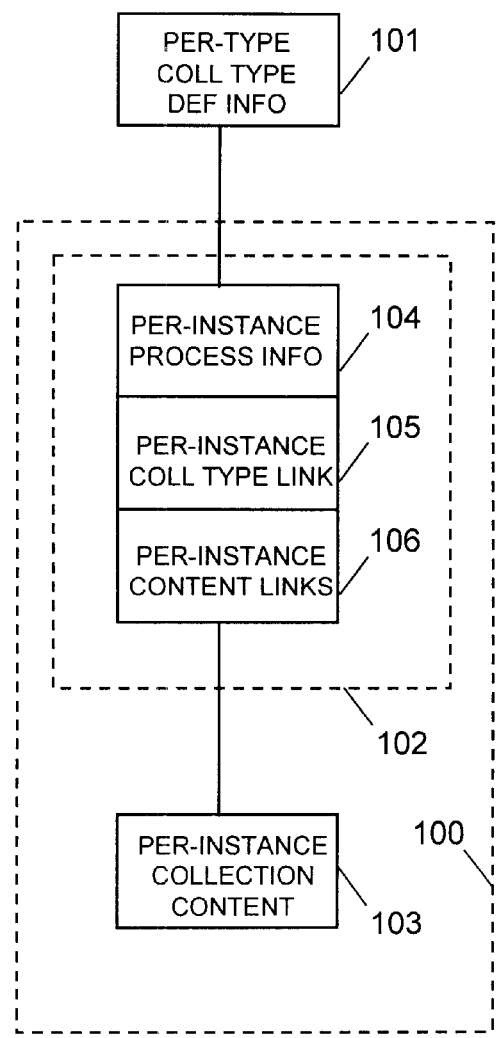
FIG. 5 shows a more detailed view of the information groupings in FIG. 4, illustrating several particular kinds of per-collection-instance and per-collection-type information.

FIGS. 4–5 show three main kinds of information that comprise collection information. FIG. 4 shows a high-level logical structure of three types of information that comprise collection information: collection processing information 101, collection specifier information 102, and collection content information 103. A logical collection 100 is comprised of a collection specifier 102 and collection content 103 together. This diagram best illustrates the logical collection information relationships that exist within a preferred filesystem implementation of collections.

FIG. 5 shows a more detailed logical structure of the same three types of information shown in FIG. 4. Collection type definition information FIG. 4 101 has been labeled as per-type information in FIG. 5 103 because there is only one instance of collection type information 101 per collection type. Collection content information FIG. 4 103 has been labeled as per-instance information in FIG. 5 103 because there is only one instance of collection content information per collection instance. Collection specifier information 102 has been partitioned into collection instance processing information 104, collection-type link information 105, and collection content link information 106. FIG. 5 is intended to show several important types of information 104–106 that are contained within collection specifiers 102.

Suppose that an application program means FIG. 6 110 knows (a) how to obtain collection processing information 101, (b) how to obtain collection content information 103, and (c) how to relate the two with per-collection-instance information 102. It follows that application program means FIG. 6 110 would have sufficient knowledge to use collection processing information 101 to process said collection content 103 in useful ways.

Collection specifiers 102 are useful because they enable all per-instance, non-collection-content information to be stored in one physical location. Collection content 103 is not included in collection specifiers because collection content 103 is often large and dispersed among many files.

All per-collection-instance information, including both collection specifier 102 and collection content 103, can be grouped into a single logical collection 100 for illustrative purposes.

Collection Application Architectures

FIGS. 6–7 show example collection-enabled application program architectures.

FIG. 6 shows how a collection information manager means 111 acts as an interface between an application program means 110 and collection information means 107 that includes collection information sources 101–103. Collectively, collection information sources 101–103 are called a collection information means 107. A collection information manager means 111 represents the union of all communication mechanisms used directly or indirectly by an application program means 110 to interact with collection information sources 101–103.

FIG. 7 shows a physical software embodiment of how an application program means 110 could use a collection information manager means 111 to obtain collection information from various collection information API (Application Programming Interface) means 112–114 connected to various collection information server means 115–117.

Collection type definition API means 112 provides access to collection type information available from collection type definition server means 115. Collection specifier API means 113 provides access to collection specifier information available from collection specifier server means 116. Collection content API means 114 provides access to collection content available from collection content server means 117.

API means 112–114, although shown here as separate software components for conceptual clarity, may optionally be implemented wholly or in part within a collection information manager means 111, or within said server means 115–117, without loss of functionality.

API means 112–114 may be implemented by any functional communication mechanism known to the art, including but not limited to command line program invocations, subroutine calls, interrupts, network protocols, or file passing techniques.

Server means 115–117 may be implemented by any functional server mechanism known to the art, including but not limited to database servers, local or network file servers, HTTP web servers, FTP servers, NFS servers, or servers that use other communication protocols such as TCP/IP, etc.

Server means 115–117 may use data storage means that may be implemented by any functional storage mechanism known to the art, including but not limited to magnetic or optical disk storage, digital memory such as RAM or flash memory, network storage devices, or other computer memory devices.

Collection information manager means 111, API means 112–114, and server means 115–117 may each or all optionally reside on a separate computer to form a distributed implementation. Alternatively, if a distributed implementation is not desired, all components may be implemented on the same computer.

Collection Data Structures

FIGS. 8–10 show several major collection data structures.

FIG. 8 shows an example collection datastructure that contains collection specifier and collection content information for a collection instance. Application programs could use such a datastructure to manage collection information for a collection that is being processed.

In particular, preferred implementations would use collection datastructures to manage collection information for collections being processed. The specific information content of a collection datastructure is determined by implementation policy. However, a collection specifier typically contains at least a collection type indicator FIG. 8 Line 4 to link a collection instance to a collection type definition.

FIG. 9 shows an example collection type definition datastructure that could be used by application programs to process collections. Specific information content of a collection type definition datastructure is determined by implementation policy. However, collection type definitions typically contain information such as shown in FIGS. 9–10.

FIG. 10 shows example information content for a collection type definition datastructure such as shown in FIG. 9. FIG. 10 shows information concerning internal collection directory structures, collection content location definitions, collection content datatype definitions, collection processing definitions, and collection results processing definitions. The specific information content of a collection type definition is determined by implementation policy. If desired, more complex definitions and more complex type definition information structures can be used to represent more complex collection structures, collection contents, or collection processing requirements.

Collection Recognizer Architecture

FIGS. 11–15 show software architectures and algorithms for collection recognizers.

Figure 11:
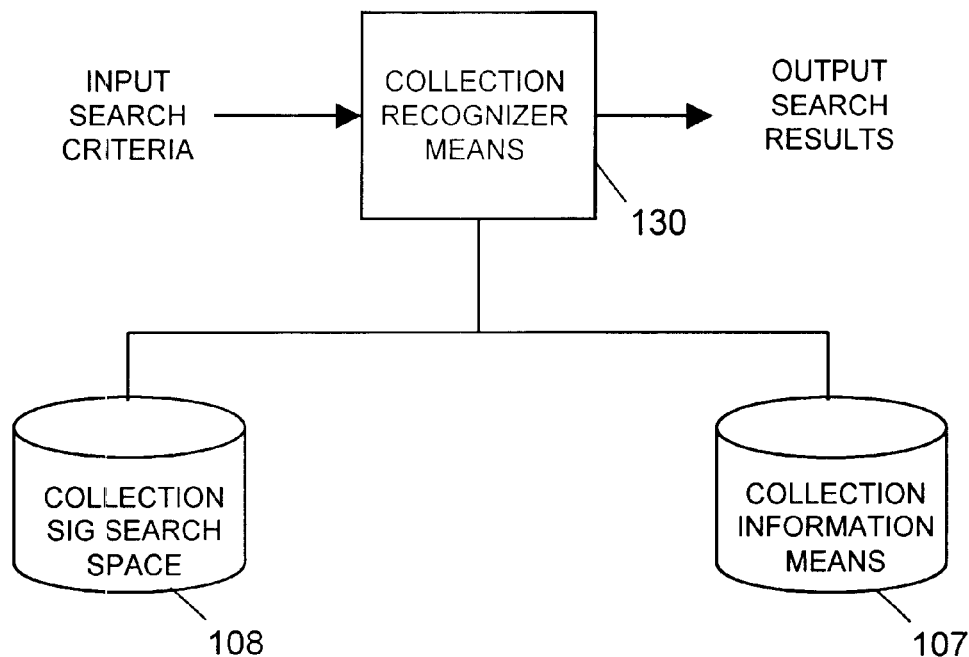
FIG. 11 shows a simplified architecture of a Collection Recognizer Means 130 connected to a Collection Signature Search Space Means 108 and a Collection Information Means 107.

FIG. 11 shows a simplified architecture of a Collection Recognizer Means 130 connected to sources of collection signature search space information 108 and collection information 107. Although shown here as separate entities for conceptual clarity, collection signature search spaces 108 and collection information sources 107 are often implemented within the same computer filesystem.

Figure 12:
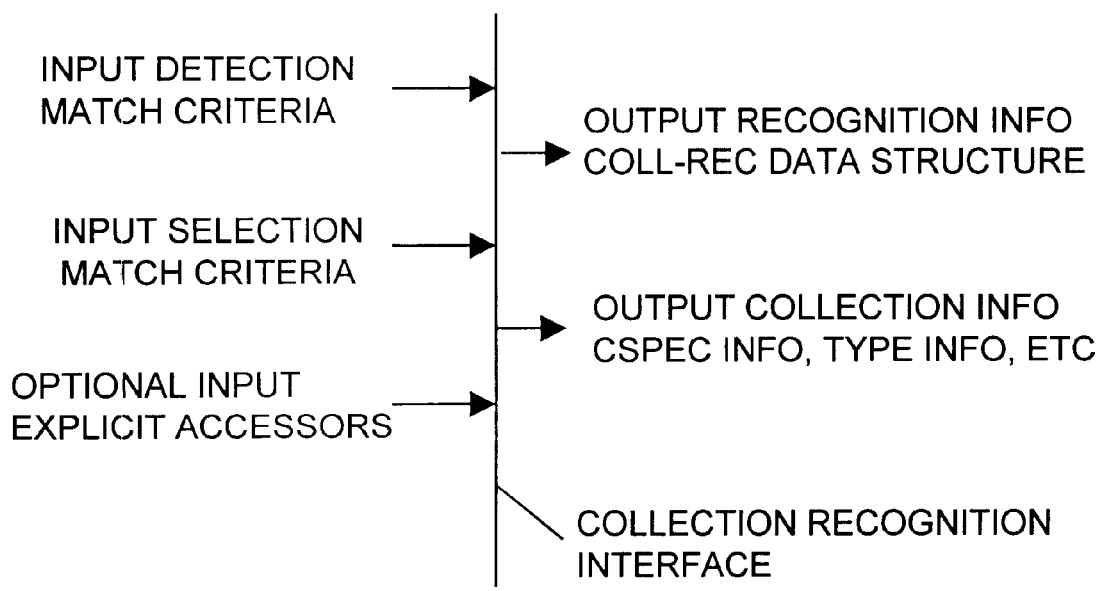
FIG. 12 shows possible information flows across a collection recognizer API (Application Programming Interface) interface, illustrating various input and output information flows across the interface.

FIG. 12 shows example information flows across a collection recognizer means 130 API (Application Programming Interface) interface, illustrating various input and output flows across the interface. The input flows depict search space, detection, and selection criteria. The output flows depict lists of detected collections, selected collections, and other information provided by the recognition process.

Collection Recognizer Terminology

Collection signature search spaces are computer data storage mechanisms that store collection signatures. Examples of typical collection signature search spaces are typical personal computer filesystems, databases, and network storage mechanisms such as FTP servers, HTTP servers, and so on. In essence, a collection signature search space can be any searchable computer storage medium.

Collection signatures are particular sets of attributes from computer data storage media that indicate the presence of a collection. Examples of typical collection signatures include particular filenames, particular directory names, particular filesystem timestamp attributes, or combinations thereof.

FIG. 23 lists several possible combinations of filesystem attributes that could be used to define collection signatures. The main purpose of a collection signature is to provide sufficient information to derive a collection specifier accessor for the collection belonging to the signature.

Collection specifier accessors are computer storage system expressions that can be used to access collection specifier information. In preferred filesystem implementations, collection accessors are pathnames to collection specifier files. An explicit collection specifier accessor is an explicit pathname that points to a valid collection specifier file. FIG. 34 shows several collection specifier accessors for typical filesystems. In database implementations, collection specifier accessors are database expressions that can be used to access collection specifier information. FIG. 36 shows an example database table that could be used to store collection specifier accessors for a database implementation.

Collection detection criteria are combinations of search space attributes that define signature match criteria. In operation, collections are detected when their signatures match the current collection detection criteria being used by a searching software module. Typically, collection detection criteria are designed to be exact matches to collection signatures. However, detection criteria can also be made broader, to detect multiple different collection signatures. FIG. 23 shows some example collection signatures that could be used for exact-match detection criteria. FIG. 34 shows some additional collection detection policies.

Collection selection criteria are collection characteristics that are used to select interesting collections from a pool of detected collections. Selection criteria can be comprised from any property or attribute or content associated with collections, including signature attributes, collection contents, or collection type definition attributes. FIG. 30 shows some example selection policies. FIG. 31 shows some possible selection tests based on signature properties and content properties.

Collection Recognizer—Operation

Figure 13:
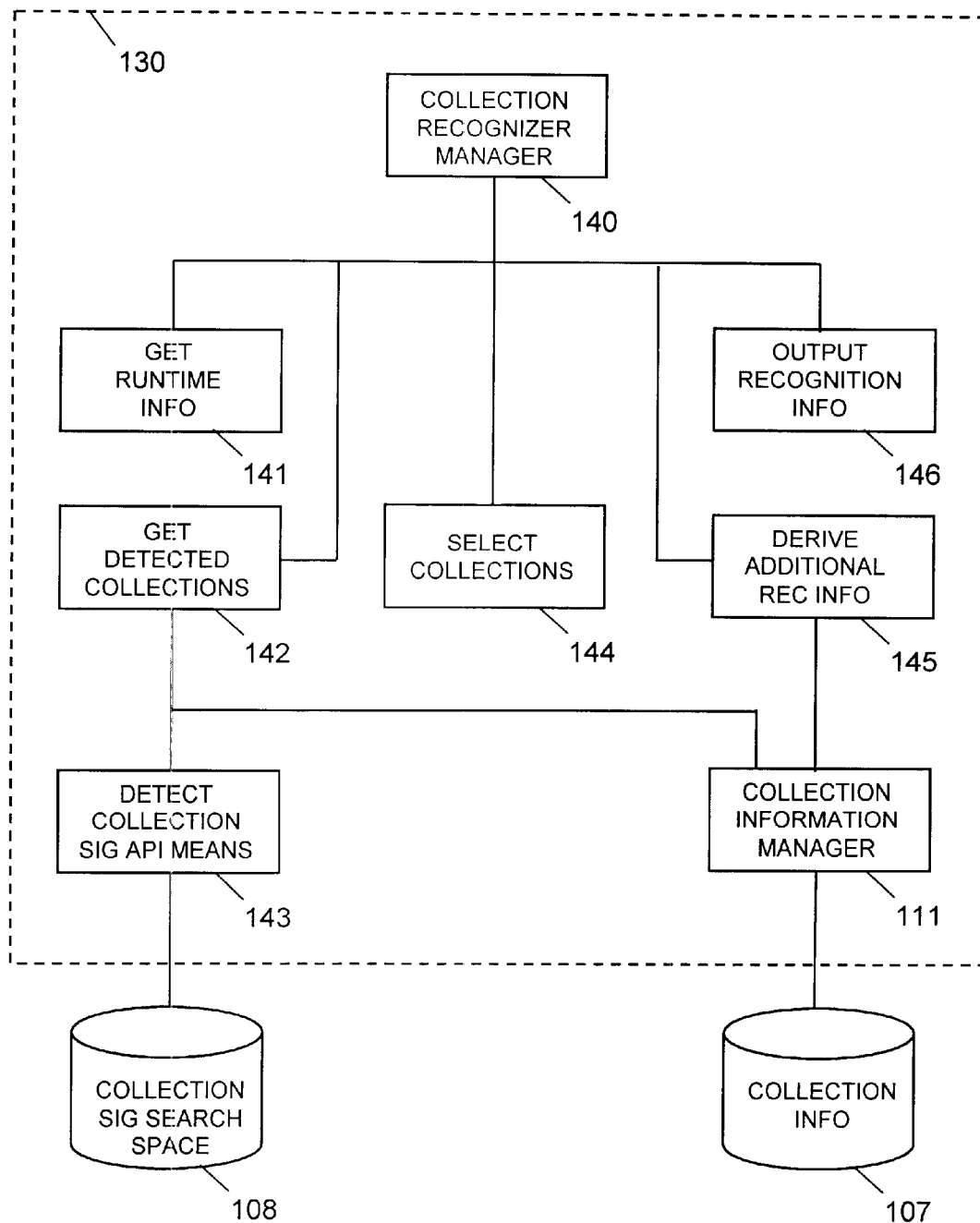
FIG. 13 shows an expanded architecture of the Collection Recognizer Means 130 shown in FIG. 11.

FIG. 13 shows a detailed architectural view of the collection recognizer means 130 software shown in FIG. 11. A collection recognizer manager 140 oversees the collection recognition process.

Module Get Runtime Info 141 obtains and prepares input arguments and runtime information required by the collection recognizer manager 140. Runtime information typically includes command line arguments, environment information, explicit collection accessors provided on the command line, and other implementation configuration options.

If appropriate input arguments and explicit collection specifier accessors are provided directly to the invocation, collection detection activities may be omitted. This is because the major purpose of the collection detection process is not required.

Having obtained all necessary input values for a recognition process, Collection Recognizer Manager 140 proceeds to carry out a recognition process with the help of modules 142–145.

Module Get Detected Collections 142 obtains and returns a list of collections that match collection signature match criteria provided to the invocation. Module Detect Collection Signatures API Means 143 interacts with a Collection Signature Search Space 108 means to obtain matching collection signatures.

Module Collection Information Manager 111 is used to retrieve collection information about the detected collections. Collection Information Managers are described in a related patent application. See the cross-references to related applications section of this document for more information.

Collection Information Sources 107 are used to provide collection specifier, collection data type, and collection content information. Collection information sources 107 are not special data storage mechanisms. Rather, they are normal data storage mechanisms known to the art, but with the additional expectation that they contain valid collection information.

Finally, Get Detected Collections 142 returns a list of interesting detected collections and associated information to Collection Recognizer Manager 140.

Module Select Collections 144 selects interesting collections from the pool of detected collections, according to selection criteria provided to the invocation.

Module Derive Additional Recognition Info 145 obtains more detailed information about selected collections and about the recognition process itself. Module Collection Information Manager 111 is used to retrieve collection information about selected collections. Collection Information Sources 107 are used to provide collection specifier, collection data type, and collection content information.

Module Output Recognition Information 146 organizes output collection recognition information from the collection recognition process in preparation for returning final information to Collection Recognizer Manager 140. Optionally, this module could write recognition information to disk, print it to a printer, or otherwise display or distribute recognition information.

FIG. 14 shows a simplified algorithm for performing collection recognition, using the software components shown in FIG. 13.

FIG. 15 shows a datastructure view of example collection recognizer output information such as might be produced by the architecture of FIG. 13 and algorithm of FIG. 14. The example recognizer output information contains lists of detected and selected collections and other recognition information.

Although a single datastructure has been used in FIG. 15 to illustrate and relate detection, selection, and other recognition information for clarity, a single data structure is not required. Other separate datastructures could also achieve the same result, providing that proper associations were maintained among the various information elements returned by the recognition process.

Derived Search Spaces

FIGS. 16–19 show example derived collection search spaces in text file and database formats, along with collection recognizer algorithms for processing the derived search spaces.

FIG. 16 shows a tree of collections stored within a typical personal computer filesystem. Collections within a filesystem can be organized in arbitrary ways, with a caution that nested collections may confuse some application programs. The acceptance, meaning, and proper treatment of nested collections are determined by implementation policy. For example, one implementation may choose to disallow nested collections, while another implementation may accept them.

FIG. 17 shows a collection list search space derived from the collection tree of FIG. 16. The derived list search space is comprised of a list of collection specifier accessor pathnames and collection type indicators. Specific information content of derived search spaces is determined by implementation policy, with the constraint that search spaces must provide enough information to support detection and selection operations. Specific detection and selection criteria are also determined by implementation policy. Policy examples for preferred implementations are shown later in this document.

FIG. 18 shows a simplified algorithm for a collection recognizer, using the derived text-file search space of FIG. 17. In particular, the algorithm does not perform any detection activities, since there is no need to detect or discover collections. All entries within derived search spaces are assumed to be formed from valid collections.

The recognition algorithm FIG. 18 proceeds by sequentially performing various kinds of selection activities on the set of collections contained within the search space of FIG. 17. Input control arguments to algorithm FIG. 18 could specify which types of selection procedures should be performed. If later selection procedures were not required, the algorithm could optionally return (e.g. FIG. 18, Line 8) without executing all selection procedures shown in the figure.

FIG. 19 shows an example logical database table layout for a derived database search space based on the collection tree shown in FIG. 16. The derived database search space is composed of one database table containing at least 2 columns describing collection specifier accessor and collection type values. Specific information content of derived search spaces is determined by implementation policy, with the constraint that derived search spaces must provide at least collection specifier accessor information sufficient for accessing valid collection specifiers.

Collections—Filesystem Implementation

FIGS. 20–23 show physical embodiments of collection-aware (CA) and non-collection-aware (NCA) filesystems that contain collection signatures that can be detected by collection recognizers.

FIG. 20 shows example software function interfaces that might be part of an example NCA filesystem API 163, such as might be found on a typical personal computer. One important feature of NCA filesystem APIs is that they do not provide functions that "understand" or manipulate collections directly. NCA filesystem APIs understand only files and directories, not collections. It follows that collection recognizers built on top of NCA APIs must provide additional software logic to implement collection-aware operations that use the underlying NCA filesystem services.

Figure 21:
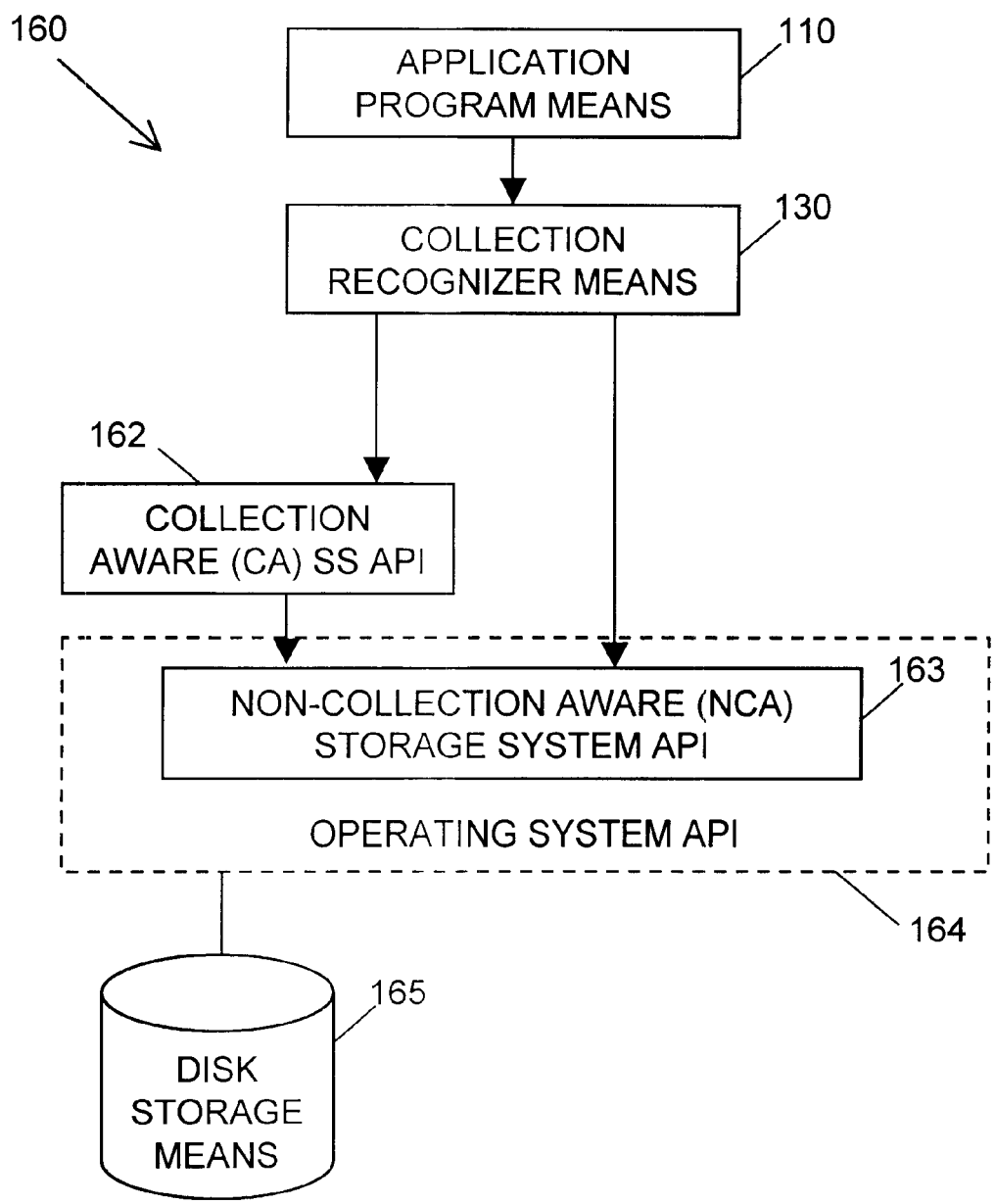
FIG. 21 shows a simplified architecture of how a Collection Recognizer Means 130 might use both collection-aware (CA) 162 and non-collection-aware (NCA) 163 API interfaces to perform collection recognition activities.

FIG. 21 shows an architectural view of how a collection recognizer means 130 might use both CA 162 and NCA 163 API interfaces to perform collection recognition activities. A collection-aware API means 162 is built on top of an NCA API means 163, which is in turn is part of a computer operating system 164.

FIG. 22 shows example software function interfaces that might be part of a collection-aware filesystem API 162. Function interfaces shown in this figure "understand" and manipulate collections directly, as evidenced by their function names.

FIG. 23 shows example collection signature criteria policies that are based on filesystem attributes provided by a typical NCA filesystem API 163 implementation. The policies shown define collection signatures that are composed of various file names, suffixes, owners, timestamps, and other attributes provided by an NCA filesystem API 163 implementation.

Collection Detection—Upward Search

FIGS. 24–26 show how collection recognizers can use up search algorithms to detect collection signatures. The main purpose of collection recognizer up searches is to identify the current working collection that is being used by an application program. Automatic recognition of the current working collection allows automated programs to act more autonomously, and saves human workers the effort of manually identifying current working collections to programs.

FIG. 24 shows an example up search algorithm for detecting a collection signature above the current working directory, using an NCA filesystem 163 search space.

FIG. 25 shows pictorially how the up search algorithm of FIG. 24 would proceed to change directories generally upward while attempting to detect a collection signature, using an NCA filesystem 163 search space. As shown by the arrows in FIG. 25, a collection recognizer will change directories upward to find a collection signature that leads to a collection specifier. In this example, the search begins in the "images" directory, and proceeds upward to the "s" directory, and thence to the "c-myhomepage" directory, where a collection signature match is found. In this example, a valid collection signature is defined by the implementation to be a directory that contains a collection specifier file 102, FIG. 25 Line 5, named "cspec".

FIG. 26 shows an example up search algorithm for detecting a collection signature, using a CA 162 filesystem search space. It is worth noting how much simpler up search algorithms are for CA interfaces. Such interfaces provide the means to directly ask for collections that meet particular search criteria. No detailed programmatic manipulation of search space information is required of software programs that use CA interfaces.

Collection Detection—Downward Search

FIGS. 27–29 show how collection recognizers use down search algorithms to detect collection signatures. The main purpose of recognizer down searches is to detect and organize multiple collections within a search space into a logical group. This enables processing of the whole group of collections with a single processing command, thereby improving the productivity and efficiency of both automated programs and human information workers.

FIG. 27 shows an example down search algorithm for detecting collection signatures below an initial starting directory, using a typical NCA 163 filesystem search space. This algorithm is appropriate for use in preferred filesystem implementations of collections. Various kinds of tree traversal algorithms known to the art can be used successfully, as implementation preferences dictate.

FIG. 28 shows how the down search algorithm of FIG. 27 might sequentially visit all collections shown in the tree of FIG. 16, in order according to (a) the depth of each collection within the tree, and to (b) the alphabetic sort order of each collection name. In particular, collections near the top of the tree are visited earlier, and collections with names that sort toward the front of the alphabet are visited earlier.

The term "visit order" refers to the order in which collections are visited by an application program. Different programs may calculate different visit orders using the same set of physical collections, according to the needs and policies of the program. However, it is more convenient for human operators if all collection processing programs within an implementation environment follow the same visit order conventions. That way, human programmers can have more confidence that particular visit orders specified by them will actually be obeyed by automated programs.

FIG. 29 shows an example down search algorithm for detecting collection signatures using a collection-aware 162 filesystem search space. Algorithms for CA search spaces are considerably less complex than algorithms for NCA search spaces because CA interfaces "understand" collections and can therefore provide higher-level, collection-oriented functionality through the CA interface.

Collection Selection

FIGS. 30–32 show how collection recognizers can select interesting collections from sets of detected collections. The main purpose of selection is to create a logical group of collections that have specific properties that are interesting to the programs that are driving the recognition process. For example, one application program might want to process collections of a particular collection type, whereas another application program might want to identify all collections that have no content files.

FIG. 30 shows example policies for selecting interesting collections from sets of detected collections that have been produced by up search or down search algorithms. In particular, selection tests can be classified into two major groups: (1) outside-collection tests based on attributes of the search space such as filename, suffix, owner, timestamps, and (2) inside-collection tests based on attributes of the collection and the collection type definition.

FIG. 31 shows example selection tests based on outside-collection (collection signature) and inside-collection (collection specifier, type, content) selection criteria. The content of specific selection tests is decided by the implementation, or by the recognizer invocation parameters.

FIG. 32 shows an example collection specifier that contains a special command option Line 4 that requests collection recognizers to skip the host collection during detection activities. As a consequence of Line 4 in the collection specifier shown in FIG. 32, the host collection owning the specifier would normally be excluded from all lists of collections (detected and selected) that were returned by a recognizer to a calling program.

Collection Recognition

FIGS. 33–34 summarize the recognition process from the viewpoints of algorithm and information content.

FIG. 33 shows an example high-level recognition algorithm that includes both detection and selection actions. The algorithm first performs a collection signature detection process to obtain collection specifier accessors. Having obtained the collection specifier accessors, the algorithm proceeds to read collection specifier, type, and content information, in preparation for selection testing. Selection testing is then performed. Finally, the algorithm optionally derives more recognition information from the recognition process, and returns recognition process output to the calling program.

FIG. 34 shows example recognition policy values for filesystem implementations of collections. Three sets of recognition policy values are shown.

The first policy set Lines 1–4 detects collections whose signatures contain a special filename "cspec", selects all detected collections, and admits all files in the subtree below the collection specifier file as collection content.

The second policy set Lines 5–8 detects collections whose signatures contain a special filename suffix ".cspec", selects only collections whose type is "html_homepage", and uses content boundary information from the collection specifier to delimit content files for the selected collections.

The third policy set Lines 9–12 detects collections whose signatures contain a special hidden directory named ".collection", selects only collections that are C programs named "helloworld", and uses content boundary information from the collection specifier to delimit content files for the selected collections.

The policy sets shown in FIG. 34 are completely arbitrary, and are provided as examples only. In practice, recognition policies are decided by the implementation and by particular recognizer invocations.

Collections—Database Implementation

FIGS. 35–40 show an example database implementation of collections. The main purpose of these figures is show that preferred implementations of collection search spaces are not limited to simple filesystems involving many files and directories. Instead, database implementations may well be more efficient and manageable for large-scale collection implementations. The specific characteristics and suitability of particular implementations for particular situations are matters to be decided by implementation designers.

FIG. 35 shows an example database schema and query expression that might be used to represent and perform collection signature detection activities, using a database implementation of collections. Although this example uses a separate database table to hold collection signature information, signature information could also be part of a larger table that served other design requirements.

FIG. 36 shows an example database schema and query expression that might be used to represent and perform collection specifier accessor calculation activities, using a database implementation of collections. Collection identifier values derived from the collection signature table of FIG. 35 are used as keys into the collection accessor table of FIG. 36.

FIG. 37 shows an example database schema and query expression that might be used to represent and perform collection specifier value access activities, using a database implementation of collections. Collection accessor values obtained from the collection accessor table of FIG. 36 are used as keys into the collection specifier values table of FIG. 37.

FIG. 38 shows an example database schema and query expression that might be used to represent and perform collection content access activities, using a database implementation of collections. In this example, collection content identifier values obtained from the collection specifier values table of FIG. 37 are used as keys into the collection content table of FIG. 38.

Specific information content, structure, and query chaining patterns among database tables are design policy matters that are determined by the implementation. The examples shown here are for illustration purposes only.

FIG. 39 shows an example high-level recognition algorithm that includes both detection and selection actions, for the sample database implementation of collections shown in previous diagrams. The example algorithm shown here parallels the structure and function of the example algorithm shown in FIG. 33, but uses a database implementation instead of a filesystem implementation of collections.

FIG. 40 shows example recognition policy decisions and values for the example database implementation of collections shown in previous diagrams.

Recognition-Enabled Applications

Figure 41:
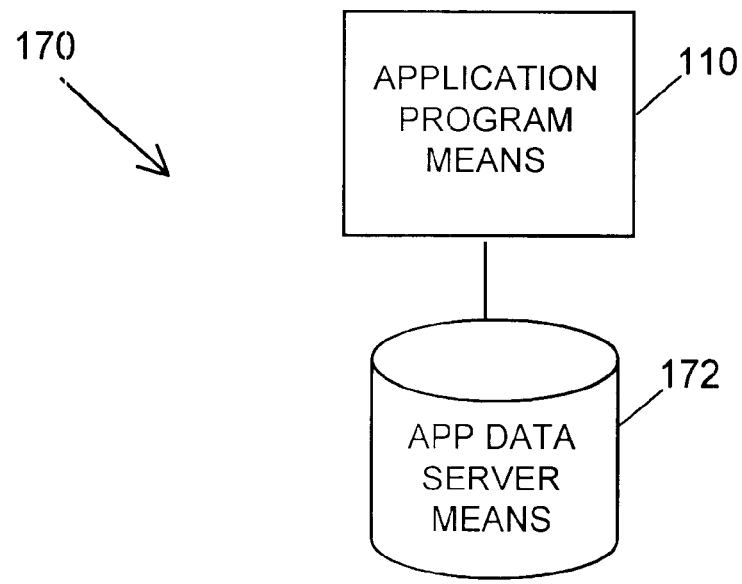
FIG. 41 shows a simplified logical architecture for a generic, non-collection-enabled, prior art application program.
Figure 42:
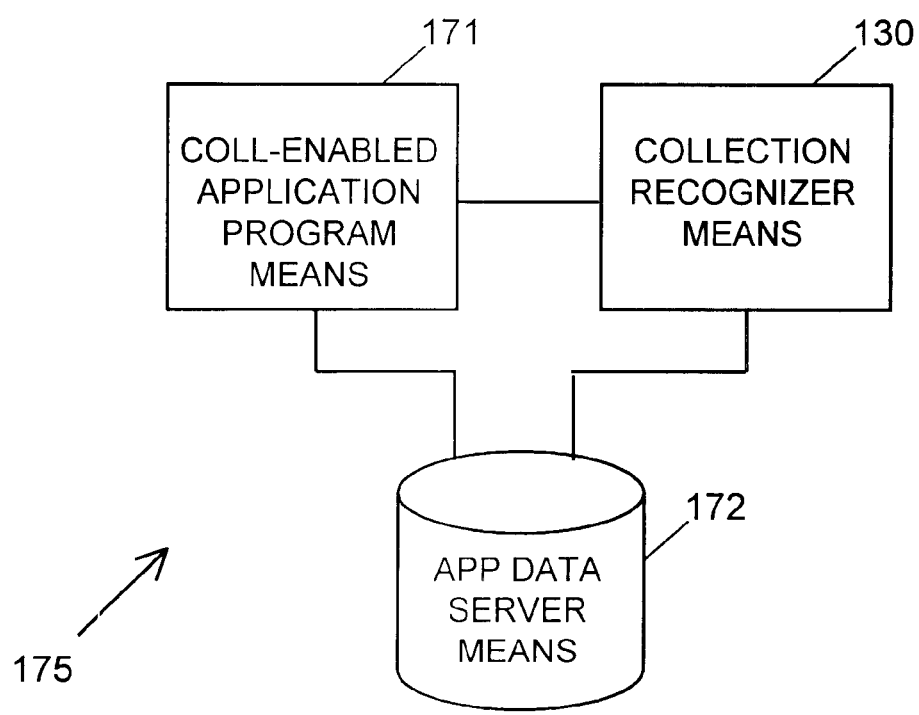
FIG. 42 shows a simplified logical architecture for a generic, Collection-Enabled Application Program 171, made collection-aware by internally modifying said application program to call a Collection Recognizer Means 130 to recognize collections within an Application Data Server Means 172.

FIGS. 41–42 compare high-level software architectures for non-collection-enabled and collection-enabled application programs.

FIG. 41 shows simplified software architecture 170 for a generic, non-collection-enabled application program means 110. A non-collection-aware application program means 110 uses an application data server means 172 to provide data to the application. In this figure, application program means 110 has no knowledge of collections, and cannot work with collections in meaningful, collection-oriented ways.

FIG. 42 shows simplified software architecture 175 for a generic, collection-enabled application program. A collection-aware application program means 171 uses a collection recognizer means 130 to recognize collections stored on an application data server means 172. A collection recognizer means 130 would return a list of recognized collections back to said application program means 171, in a datastructure such as the one shown in FIG. 15. Now having a list of recognized collections in its possession, the collection-aware application program means 171 can process the recognized collections in meaningful, collection-oriented ways.

Collection-aware application architecture 175 is appropriate for situations where it is both feasible and desirable to add collection support to application programs by making internal modifications to the application programs. Note that application program means 171 differs from NCA application program means 110 by the internal modifications required to integrate collection recognizer means 130 into said application architecture 175.

Figure 43:
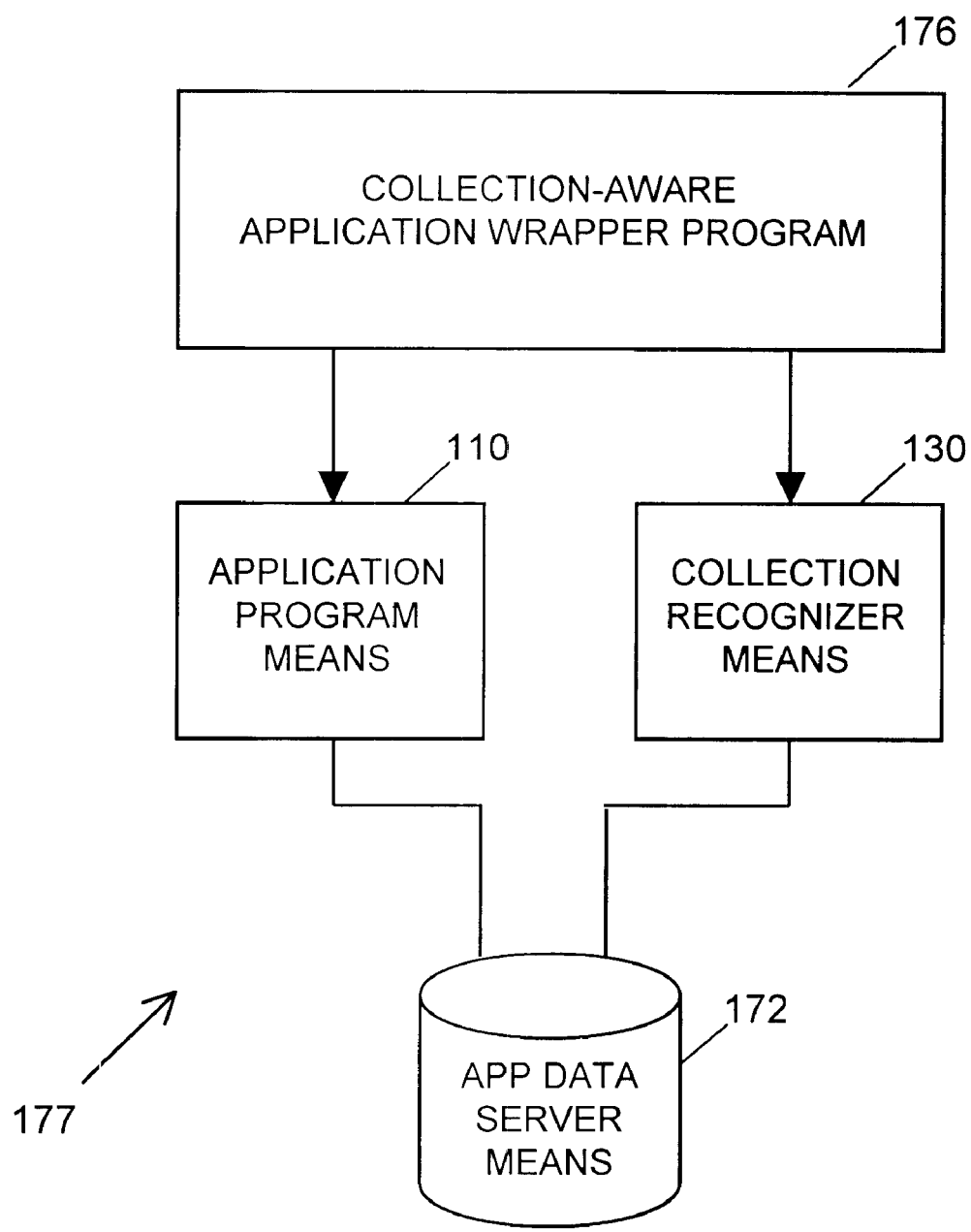
FIG. 43 shows a simplified logical architecture for a generic, Collection-Enabled Application Program 171, made collection-aware by adding an external wrapper program to relate said application program with a Collection Recognizer Means 130 to recognize collections within an Application Data Server Means 172.

FIG. 43 shows an alternate high-level architecture 177 for a generic, collection-enabled application program. Collection-aware architecture 177 is appropriate for situations in which an NCA application program means 110 cannot be internally modified to interact with a collection recognizer means 130 in the architectural pattern 175 shown in FIG. 42. Instead, a CA application wrapper program 176 provides a desired CA interface to users by using the services of both an NCA application program means 110 and a collection recognizer means 130.

Collection-aware application architecture 177 is appropriate for situations where it is not feasible and desirable to add internal collection support to NCA application program means 110 by making internal modifications to the application program means 110. Instead, new wrapper programs are created to serve as new and value-added collection-aware interfaces to existing application programs.

CONCLUSION

The present collection recognizer invention is a general, customizable, extensible, and scalable solution to the collection recognition problem faced by automated collection processing systems.

In particular, collection recognizers provide programs with a practical means for recognizing and obtaining detailed information about interesting collections for processing, and thereby enable such automated systems to perform automated computations that were not possible before.

RAMIFICATIONS

Although the foregoing descriptions are specific, they should be considered as sample embodiments of the invention, and not as limitations. Those skilled in the art will understand that many other possible ramifications can be imagined without departing from the spirit and scope of the present invention.

General Software Ramifications

The foregoing disclosure has recited particular combinations of program architecture, data structures, and algorithms to describe preferred embodiments. However, those of ordinary skill in the software art can appreciate that many other equivalent software embodiments are possible within the teachings of the present invention.

As one example, data structures have been described here as coherent single data structures for convenience of presentation. But information could also be could be spread across a different set of coherent data structures, or could be split into a plurality of smaller data structures for implementation convenience, without loss of purpose or functionality.

As a second example, particular software architectures have been presented here to more strongly associate primary algorithmic functions with primary modules in the software architectures. However, because software is so flexible, many different associations of algorithmic functionality and module architecture are also possible, without loss of purpose or technical capability. At the under-modularized extreme, all algorithmic functionality could be contained in one software module. At the over-modularized extreme, each tiny algorithmic function could be contained in a separate software module.

As a third example, particular simplified algorithms have been presented here to generally describe the primary algorithmic functions and operations of the invention. However, those skilled in the software art know that other equivalent algorithms are also easily possible. For example, if independent data items are being processed, the algorithmic order of nested loops can be changed, the order of functionally treating items can be changed, and so on.

Those skilled in the software art can appreciate that architectural, algorithmic, and resource tradeoffs are ubiquitous in the software art, and are typically resolved by particular implementation choices made for particular reasons that are important for each implementation at the time of its construction. The architectures, algorithms, and data structures presented above comprise one such conceptual implementation, which was chosen to emphasize conceptual clarity.

From the above, it can be seen that there are many possible equivalent implementations of almost any software architecture or algorithm, regardless of most implementation differences that might exist. Thus when considering algorithmic and functional equivalence, the essential inputs, outputs, associations, and applications of information that truly characterize an algorithm should also be considered. These characteristics are much more fundamental to a software invention than are flexible architectures, simplified algorithms, or particular organizations of data structures.

Practical Applications

Collection recognizers can be used in various practical applications. One application is to improve the productivity of human computer programmers by providing them with an automated means of detecting and selecting interesting collections for processing.

Another application is to enable the construction of automated collection processing systems that are capable of detecting, selecting, and processing collections according to dynamic input values provided to the invocation.

Another application is to enable application programs to dynamically discover the current working collection at program invocation time, thereby helping the program to react to the current computational situation.

Other applications can also be imagined by those skilled in the art.

Functional Enhancements

One possible functional enhancement is to modify a collection recognizer to work with various formats of collection specifiers and collection type definition. For example, a collection specifier could be modified to work with popular markup languages such as SGML, XML, or HTML, or with other more formally structured languages.

Collection Search Space Variations

Example filesystem and database search space implementations were discussed in the foregoing specification. However, other search space mechanisms are also possible.

For example, in-memory search spaces could be used for greater speed, using datastructures known to the art, such as hash tables, lists, and tree structures. Similarly, network search spaces available by network protocol API means could be used for distributed implementations. In addition, these alternative search spaces could be either collection-aware or non-collection-aware implementations, as design considerations dictate.

Collection Identification Means

The fundamental purpose of collection recognizers is to identify interesting collections on behalf of calling programs. Although the examples given here described collection recognizers as returning lists of recognized collections to calling programs, returning lists of collections is not the only method of identifying interesting collections.

As one alternative, a collection recognizer could physically mark or modify each recognized collection within the search space, thereby making it possible for other humans or programs to identify marked collections at a later time.

As another alternative, a collection recognizer could copy or relocate recognized collections into different physical locations, thereby identifying interesting collections by their new physical locations.

Still another alternative would be to write a list of interesting collections to an external location, for later use.

In all of these alternative collection identification means variations, the goals of recognition are accomplished without requiring a recognizer to return a list of recognized collections to a calling program. Even so, returning a list of collections in a collection recognition data structure is the preferred mechanism.

Alternative Implementations

Each API means identified in the specification may be implemented by any functional API mechanism known to the art, including using command line program invocations, subroutine calls, interrupts, network protocols, remote procedure invocations, or other file and information passing techniques.

Each server means identified in the specification may be implemented by any functional server mechanism known to the art, including but not limited to database servers, local or network file servers, HTTP web servers, FTP servers, NFS servers, or servers that use other network communication protocols known to the art, such as TCP/IP.

Each server means identified in the specification may use a data storage means that may be implemented by any functional storage mechanism known to the art, including but not limited to magnetic or optical disk storage, digital memory such as RAM or flash memory, network storage devices or other computer memory devices known to the art.

Each software component identified in the specification may optionally reside on a separate computer to form a distributed implementation. However, if a distributed implementation is not desired, all components may reside on the same computer.

Although collection and recognizer data structures have been described here as coherent single structures, other implementations are possible. For example, information could be split into a plurality of smaller data structures for implementation or communication convenience, without loss of functionality.

As can be seen by one of ordinary skill in the art, many other ramifications are also possible within the teachings of this disclosure. However, all implementations share the same general conceptual goal of enabling application programs to use collection recognizers to detect and select interesting collections from collection search spaces.

SCOPE

The present invention is not limited to any particular computer architecture, operating system, filesystem, database, or other software implementation.

Therefore the full scope of the present invention should be determined by the accompanying claims and their legal equivalents, rather than from the examples given in the specification.

I claim:

1. A collection recognizer process for making information about recognized collections available to software programs, to be performed on or with the aid of a programmable device, comprising the following steps:

(a) receiving a request for information about detected collections, (b) detecting collection signatures within a collection signature search space, thereby forming a set of detected collections, wherein collection signatures are particular sets of attributes from computer data storage media that are capable of indicating the presence of valid collections, and collection signature search spaces are searchable computer data storage mechanisms that are capable of storing collection signatures, and (c) making information about said detected collections available for use by software programs, wherein collections are data structures comprised of a collection specifier and collection content containing zero or more collection content files, and wherein a collection specifier contains at least a collection type indicator to link a collection instance to a collection type definition, thereby providing software programs with a convenient, practical means for obtaining a list of interesting collections to process, and thereby improving productivity of human workers by making it possible for automated systems to recognize collections for automated processing without human assistance.

2. The process of claim 1, further comprising:

(a) obtaining collection content information for one or more said detected collections, and (b) making said collection content information available for use by software programs, thereby providing software programs with a practical means for obtaining content information for interesting collections, for the purposes of subsequent automated processing of said interesting collections.

3. The process of claim 2, wherein (a) said step of obtaining collection content information defines collection content for a collection to include all files in a subtree that is rooted at a directory containing an associated collection specifier file for said collection, thereby providing a convenient collection recognizer implementation policy that allows collection selection to proceed without reference to associated collection type definitions for collections that are being selected.

4. The process of claim 2, wherein (a) said step of obtaining collection content information determines collection content for a collection in part by using associated collection type definition information for said collection, thereby enabling collection recognizers to use more powerful selection criteria based on extensive collection type definition information.

5. The process of claim 1, further comprising:

(a) selecting collections from said set of detected collections, thereby forming a set of selected collections, and (b) making information about said selected collections available for use by software programs, thereby providing software programs with a practical means for obtaining the identities of detected and selected collections for processing.

6. The process of claim 5, wherein (a) said step of selecting collections from the set of detected collections uses associated collection type definition information for collections being selected, thereby enabling collection recognizers to perform more complex, more precise selection actions by using detailed collection type information.

7. The process of claim 5, wherein (a) said step or selecting collections from the set of detected collections uses associated collection content information for collections being selected, thereby enabling collection recognizers to perform more complex, more precise selection actions by using detailed collection content information.

8. The process of claim 1, wherein (a) said step of detecting collection signatures within a collection signature search space uses collection specifier filename information, thereby enabling a more efficient detection process that directly uses provided collection specifier filenames as collection specifier accessors, without having to derive accessors from collection signatures.

9. The process of claim 1, wherein (a) said step of detecting collection signatures within a collection signature search space uses a collection signature up search algorithm, thereby providing programs with an efficient means of determining a current working collection for the program.

10. The process of claim 1, wherein (a) said step of detecting collection signatures within a collection signature search space uses a collection signature down search algorithm, thereby providing programs with an efficient means of determining sets of detected collections contained within a subtree below a designated starting directory.

11. The process of claim 1, wherein (a) said collection signature search space is a typical hierarchical computer file system, thereby enabling collection recognizers to work on typical computer file systems such as those found on typical personal computers.

12. The process of claim 1, wherein (a) said collection signature search space is implemented using a relational database, thereby enabling collection recognizers to work efficiently with large-scale collection signature search spaces that are implemented using relational databases to store collection information.

13. The process of claim 1, wherein (a) said collection signature search space is implemented using a network protocol interface, thereby enabling collection recognizers to work with distributed collection signature search spaces that are implemented at least in part using a network protocol interface to interact with remote servers.

14. A programmable collection recognizer device for making information about recognized collections available to software programs, whose actions are directed by software executing a process comprising the following steps:

(a) receiving a request for information about detected collections, (b) detecting collection signatures within a collection signature search space, thereby forming a set of detected collections, wherein collection signatures are particular sets of attributes from computer data storage media that are capable of indicating the presence of valid collections, and collection signature search spaces are searchable computer data storage mechanisms that are capable of storing collection signatures, and (c) making information about said detected collections available for use by software programs, wherein collections are data structures comprised of a collection specifier and collection content containing zero or more collection content files, and wherein a collection specifier contains at least a collection type indicator to link a collection instance to a collection type definition, thereby providing software programs with a convenient, practical means for obtaining a list of interesting collections to process, and thereby improving productivity of human workers by raking it possible for automated systems to recognize collections for automated processing without human assistance.

15. The programmable device of claim 14, further comprising:

(a) obtaining collection content information for one or more said detected collections, and (b) making said collection content information available for use by software programs, thereby providing software programs with a practical means for obtaining content information for interesting collections, for the purposes of subsequent automated processing of said interesting collections.

16. The programmable device of claim 15, wherein (a) said step of obtaining collection content information defines collection content for a collection to include all files in a subtree that is rooted at a directory containing an associated collection specifier file for said collection, thereby providing a convenient collection recognizer implementation policy that allows collection selection to proceed without reference to associated collection type definitions for collections that are being selected.

17. The programmable device of claim 15, wherein (a) said step of obtaining collection content information determines collection content for a collection in part by using associated collection type definition information for said collection, thereby enabling collection recognizers to use more powerful selection criteria based on extensive collection type definition information.

18. The programmable device of claim 14, further comprising:

(a) selecting collections from said set of detected collections, thereby forming a set of selected collections, and (b) making information about said selected collections available for use by software programs, thereby providing software programs with a practical means for obtaining the identities of detected and selected collections for processing.

19. The programmable device of claim 18, wherein (a) said step of selecting collections from the set of detected collections uses associated collection type definition information for collections being selected, thereby enabling collection recognizers to perform more complex, more precise selection actions by using detailed collection type information.

20. The programmable device of claim 18, wherein (a) said step of selecting collections from the set of detected collections uses associated collection content information for collections being selected, thereby enabling collection recognizers to perform more complex, more precise selection actions by using detailed collection content information.

21. The programmable device of claim 14, wherein (a) said collection signature search space is implemented using a relational database, thereby enabling collection recognizers to work efficiently with large-scale collection signature search spaces that are implemented using relational databases to store collection information.

22. The programmable device of claim 14, wherein (a) said collection signature search space is implemented using a network protocol interface, thereby enabling collection recognizers to work with distributed collection signature search spaces that are implemented at least in part using a network protocol interface to interact with remote servers.

23. A computer readable memory, encoded with data representing a computer program, that can be used to direct a computer when used by the computer, comprising:

(a) means for receiving a request for information about detected collections, (b) means for detecting collection signatures within a collection signature search space, thereby forming a set of detected collections, wherein collection signatures are particular sets of attributes from computer data storage media that are capable of indicating the presence of valid collections, and collection signature search spaces are searchable computer data storage mechanisms that are capable of storing collection signatures, and (c) means for making information about said detected collections available for use by software programs, wherein collections are data structures comprised of a collection specifier and collection content containing zero or more collection content files, and wherein a collection specifier contains at least a collection type indicator to link a collection instance with a collection type definition, thereby providing software programs with a convenient, practical means for obtaining a list of interesting collections to process, and thereby improving productivity of human workers by making it possible for automated systems to recognize collections for automated processing without human assistance.

24. The computer readable memory of claim 23, further comprising:

(a) means for obtaining collection content information for one or more said detected collections, and (b) means for making said collection content information available for use by software programs, thereby providing software programs with a practical means for obtaining content information for interesting collections, for the purposes of subsequent automated processing of said interesting collections.

25. The computer readable memory of claim 24, wherein (a) said means for obtaining collection content information defines collection content for a collection to include all files in a subtree that is rooted at a directory containing an associated collection specifier file for said collection, thereby providing a convenient collection recognizer implementation policy that allows collection selection to proceed without reference to associated collection type definitions for collections that are being selected.

26. The computer readable memory of claim 24, wherein
(a) said means for obtaining collection content information determines collection content for a collection in part by using associated collection type definition information for said collection, thereby enabling collection recognizers to use more powerful selection criteria based on extensive collection type definition information.

27. The computer readable memory of claim 23, further comprising:
(a) means for selecting collections from said set of detected collections, thereby forming a set of selected collections, and
(b) means for making information about said selected collections available for use by software programs, thereby providing software programs with a practical means for obtaining the identities of detected and selected collections for processing.

28. The computer readable memory of claim 27, wherein
(a) said means for selecting collections from the set of detected collections uses associated collection type definition information for collections being selected, thereby enabling collection recognizers to perform more complex, more precise selection actions by using detailed collection type information.

29. The computer readable memory of claim 27, wherein
(a) said means for selecting collections from the set of detected collections uses associated collection content information for collections being selected, thereby enabling collection recognizers to perform more complex, more precise selection actions by using detailed collection content.

30. The computer readable memory of claim 23, wherein
(a) said means for detecting collection signatures within a collection signature search space uses collection specifier filename information, thereby enabling a more efficient detection process that can directly use provided collection specifier filenames as collection specifier accessors, without having to derive accessors from collection signatures.

31. The computer readable memory of claim 23, wherein
(a) said means for detecting collection signatures within a collection signature search space uses a collection signature up search algorithm, thereby providing programs with an efficient means of determining a current working collection for the program.

32. The computer readable memory of claim 23, wherein
(a) said means for detecting collection signatures within a collection signature search space uses a collection signature down search algorithm, thereby providing programs with an efficient means of determining sets of detected collections contained within a subtree below a designated starting directory.

33. The computer readable memory of claim 23, wherein
(a) said means for detecting collection signatures is capable of using a collection signature search space that is a hierarchical computer file system, thereby enabling collection recognizers to work on typical computer file systems such as those found on typical personal computers.

34. The computer readable memory of claim 23, wherein
(a) said means for detecting collection signatures is capable of using a collection signature search space that is implemented using a relational database, thereby enabling collection recognizers to work efficiently with large-scale collection signature search spaces that are implemented using relational databases to store collection information.

35. The computer readable memory of claim 23, wherein
(a) said means for detecting collection signatures is capable of using a collection signature search space that is implemented using a network protocol interface, thereby enabling collection recognizers to work with distributed collection signature search spaces that are implemented at least in part using a network protocol interface to interact with remote servers.

* * * * *